US009586066B2

(12) United States Patent
Klein et al.

(10) Patent No.: US 9,586,066 B2
(45) Date of Patent: *Mar. 7, 2017

(54) FIRE PROTECTION COLLAR

(71) Applicant: Hilti Aktiengesellschaft, Schaan (LI)

(72) Inventors: Manfred Klein, Kaufering (DE); Ulf Mordau, Waal (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 0 days.

This patent is subject to a terminal disclaimer.

(21) Appl. No.: 14/434,841

(22) PCT Filed: Oct. 8, 2013

(86) PCT No.: PCT/EP2013/070875
§ 371 (c)(1),
(2) Date: Apr. 10, 2015

(87) PCT Pub. No.: WO2014/056865
PCT Pub. Date: Apr. 17, 2014

(65) Prior Publication Data
US 2015/0251028 A1    Sep. 10, 2015

(30) Foreign Application Priority Data
Oct. 11, 2012 (DE) .......... 10 2012 218 540

(51) Int. Cl.
*F16L 5/04* (2006.01)
*A62C 8/00* (2006.01)
(Continued)

(52) U.S. Cl.
CPC ............... *A62C 2/065* (2013.01); *F16L 5/04* (2013.01); *H02G 3/0412* (2013.01)

(58) Field of Classification Search
CPC ......... F16L 5/04; F16L 521/02; F16L 17/035; F16L 17/025; A62C 2/06
(Continued)

(56) References Cited

U.S. PATENT DOCUMENTS 4,061,344 A    12/1977  Bradley et al.
4,302,917 A *  12/1981  Fermvik .................. H02G 1/00
                                                    248/56
(Continued)

FOREIGN PATENT DOCUMENTS

DE    8303168 U1    9/1983
DE    19809973 C1   7/1999
(Continued)

OTHER PUBLICATIONS

International Search Report for PCT/EP2013/070875, dated Sep. 11, 2014, 2 pages (translation).
(Continued)

*Primary Examiner* — Kristina Fulton
*Assistant Examiner* — Eugene G Byrd
(74) *Attorney, Agent, or Firm* — McAndrews, Held & Malloy, Ltd.

(57) ABSTRACT

A fire protection collar which can be installed on a wall or ceiling, for the purpose of sealing off conduits which pass through walls or ceilings, having an intumescent fire protection insert, a cladding part which surrounds the fire protection insert, wherein the fire protection insert is arranged on the inner side thereof, and at least one fastening part which protrudes radially outward from at least one end face of the cladding part, is characterized in that the intumescent fire protection insert is designed as a molded body which yields to deformation, which entirely fills in the space encompassed by the housing, and which is a two-piece component formed from two elements.

19 Claims, 4 Drawing Sheets

(51) Int. Cl.
*A62C 2/06* (2006.01)
*H02G 3/04* (2006.01)

(58) Field of Classification Search
USPC .......................................... 277/616; 169/48
See application file for complete search history.

(56) References Cited

U.S. PATENT DOCUMENTS

| | | | | | |
|---|---|---|---|---|---|
| 4,538,389 | A | * | 9/1985 | Heinen | F16L 5/04 137/75 |
| 4,622,436 | A | * | 11/1986 | Kinnan | H02G 15/04 174/23 R |
| 4,646,486 | A | * | 3/1987 | Hauff | H01B 17/308 169/54 |
| 4,889,298 | A | * | 12/1989 | Hauff | F16L 5/08 174/503 |
| 5,947,159 | A | * | 9/1999 | Takahashi | F16L 5/04 138/128 |
| 6,725,615 | B1 | * | 4/2004 | Porter | A62C 2/065 52/1 |
| 7,712,791 | B1 | * | 5/2010 | Whitehead | F16L 5/04 285/196 |
| 8,910,949 | B2 | * | 12/2014 | Åkesson | A62C 2/065 277/616 |
| 9,121,527 | B2 | | 9/2015 | Munzenberer et al. | |
| 2004/0149390 | A1 | * | 8/2004 | Monden | F16L 5/04 156/391 |
| 2006/0006611 | A1 | * | 1/2006 | Foerg | A62C 2/065 277/602 |
| 2006/0037264 | A1 | * | 2/2006 | Paetow | F16L 5/04 52/220.1 |
| 2008/0011383 | A1 | * | 1/2008 | Paetow | F16L 5/04 138/177 |
| 2011/0210222 | A1 | * | 9/2011 | Van Walraven | F16L 5/04 248/315 |
| 2013/0068487 | A1 | * | 3/2013 | Klein | A62C 2/065 169/45 |

FOREIGN PATENT DOCUMENTS

| | | | | |
|---|---|---|---|---|
| DE | 20006976 U1 | 8/2001 | | |
| EP | 0675308 A1 | 10/1995 | | |
| EP | 1635100 | 3/2006 | | |
| GB | 2186443 | 8/1987 | | |
| JP | 2008095735 A | 4/2008 | | |
| LI | DE 102011082911 A1 | * | 3/2013 | ............. A62C 2/065 |
| LI | DE 102011089531 A1 | * | 6/2013 | ................ F16L 5/04 |

OTHER PUBLICATIONS

Deutsches Institut für Bautechnik: Kabelabschottung "Hilti Brandschutz-System CP 657 Box" der Feuerwiderstandsklasse S90, S60 oder S30 nach DIN 4102-9, Allgemeine bauaufsichtliche Zulassung, Z-19.15-1394, Berlin, Jun. 16, 2010 (20 pages).
German Office Action for DE1020122185402, dated Sep. 2, 2016, 10 pages.

\* cited by examiner

FIRE PROTECTION COLLAR

CROSS-REFERENCE TO RELATED APPLICATIONS

The present application is filed pursuant to 37 U.S.C. 371 as a U.S. National Phase application of International Patent Application No. PCT/EP2013/070875, which was filed Oct. 8, 2013, and which claims priority to German Patent Application No. 102012218540.2, having a filing date of Oct. 11, 2012, both of which are incorporated herein by reference in their entirety.

BACKGROUND

The invention relates to a fire protection collar, which can be installed on a wall or ceiling, for the purpose of sealing off conduits which pass through walls or ceilings, having an intumescent fire protection insert, a cladding part, wherein the fire protection insert is arranged on the inner side thereof, and at least one fastening part which protrudes radially outward from at least one end face of the cladding part.

Such fire protection collars are known in many different designs. They serve the purpose of, in the event of a fire, closing passages through walls, ceilings, or floors of buildings through which the combustible or meltable pipes pass. For this purpose, the fire protection collar is arranged around the pipe such that, in the event of a fire, the fire protection insert which expands as a result seals the passage as tightly as possible. The fire protection collar is typically arranged on the outer side of the opening—that is, by way of example, on the wall through which the passage extends. Sheet metal is typically used as a mantle for the strips of intumescent material. The foaming pressure of the fire protection insert generated in the event of a fire can be well supported by such a mantle, such that the configuration ensures that the fire protection insert expands specifically in the direction where the opening is supposed to be closed.

It is a disadvantage in the known constructions that the fire protection insert is designed as strips which are only several millimeters wide, and does not fully fill in the space spanned by the mantle. As a result, for a given collar circumference, there is no flexibility with regard to the circumference of the pipe conduit which the collar surrounds. As such, a certain type of collar is only suitable for a certain diameter of pipe, and it is not possible to tightly seal off the annular gap between the pipe and the passage against smoke gases if the diameter of the pipe which the collar surrounds is smaller than the diameter specified by the collar.

In particular, when the known fire protection collars are used for conduits, cables, and the like, it would only be possible to lay further conduits or cables by exchanging the collar which is already installed for one with a greater circumference. In addition, as a result of the collar itself, which conventionally consists of a sheet metal mantle, the circumference of the conduit(s) and cable(s) being sealed off would be limited below a point, such that it is not possible to enclose all small circumferences using the collar. For this reason, these fire protection collars are not used to seal off individual conduits or cables with relatively small diameters.

Because the fire protection inserts in the known fire protection collars are typically only minimally compressible, it is not possible to tightly seal off conduit sections which consist of multiple cables from smoke gas. This is because the gap between the individual conduits cannot be sealed off by the fire protection insert. A further measure is necessary for this purpose—such as the additional sealing of the structural passage by means of a fire retardant foam, a fire retardant fill material, or the like, by way of example.

Furthermore, the known fire protection collars do not provide a smoke gas-proof seal if the cables are laid without any structure. This is because the fire protection collars are only minimally flexible and are conceived for sealing off pipe and conduit sections of a certain diameter which are as round as possible.

In practice, cable harnesses are typically sealed using intumescent sealants such as fire retardant foams, fire retardant mortars, or other sealants, wherein the gap between the cable harness and the structure is filled with the intumescent sealant. In this case, there is no reliable guarantee of compliance with the installation code as concerns the approval of the fire retardant products and maximum cable allocation, installation depth, maximum opening cross-section, and wall spacing. Moreover, the retroactive sealing of cable passages is time-consuming.

BRIEF SUMMARY OF THE INVENTION

The problem addressed by the invention is that of creating a fire protection collar which can be used with greater flexibility and can be adapted on site, with little effort, to the specific, needed conduit—or cable diameter.

According to the invention, this problem is addressed in that the intumescent fire protection insert is designed as a molded body which yields to deformation, which entirely fills in the space encompassed by the housing, and which is a two-piece component formed from two elements which together make up the molded body. The molded body in this case can be designed as a cube, cuboid, prism, or cylinder. The molded body is preferably designed as a cylinder which is formed by two half cylinder elements. The base surface and the top surface in this case can assume any shapes which can be encompassed by a collar—particularly circular, elliptical, polygonal, and for example hexagonal.

"Yields to deformation" in the context of the invention means that the material of which the fire protection insert consists is so elastic that it is possible to compress it easily—that is, without great application of force—for example with one hand, and the fire protection insert can once again take its original shape. In this way, the configuration ensures that the conduits or cables are encompassed with a flush fit, and therefore are sealed against smoke gases. This is particularly advantageous in the case of cable bundles because the material of the fire protection insert pushes into the gap between the outer, adjacent cables, and likewise seals the same.

The two-part shape greatly simplifies a retroactive installation of the fire protection collar around conduits or pipes which are already routed through structure openings. If the molded body is made somewhat larger than the space encompassed by the cladding part, the two half elements are compressed against each other such that it is possible to achieve a satisfactory seal against cold smoke gases when installed.

However, it has been found that the seal against hot air and hot gases is not sufficient in the event of a fire if the contact surface—that is, the surface at which the two half elements, particularly the half cylinders, about each other when installed—is flat. This is because heat can penetrate into the gap between the half elements, despite the compression of the two half elements—particularly the half cylinders—and lead to an early warming of the cold side of the collar—that is, the side which is opposite the fire.

Particularly in the case of greater diameters of the fire protection collar, the gap is also a weak spot in the hose stream test mandated in the USA, wherein a hose stream is aimed at high pressure at a fireproof bulkhead following the combustion test, and no water is allowed to push through the bulkhead. If the block of cinders formed on the burn side following the burn test does not stand up to the high pressure of the hose stream, or is fully burned away, the gap which is present on the cold side—that is, the side of the bulkhead which faces away from the fire—where the collar is generally still intact and the intumescent material has not yet been activated, can open, and water can pass through to the cold side.

Therefore, for the purpose of increasing the tightness of the gap, in one preferred embodiment of the invention the surfaces of the contact surface of the two-part, particularly half cylinder, elements are structured—that is, the surface is configured with bumps and depressions.

As a result of the structured surfaces of the half cylinder, the fire protection insert further seals when the conduit or the pipe which passes through it is pressed into the same, without the necessity of cutting out the contour of the conduit from the fire protection element in advance. The elastic and deformable property of the material makes it possible for the bumps which contact the conduit to either be compressed, thereby expanding the compressed bumps, or to be pushed away laterally. In addition, at the point where the surfaces of the half cylinders engage with each other, a meshing of the surfaces is achieved. In this way, the molded body is able to stand up to the high pressure of the hose stream in the hose stream test.

A further advantage of the structured surfaces is that conduits can be easily inserted in the event of a retroactive laying of cable, without too much resistance. The flexibility and the elasticity of the material make it possible for the bumps, when a conduit or a pipe is inserted retroactively, to yield to the conduit such that the same can be inserted without much resistance and without much damage to the fire protection element. In the event that a few bumps are torn off during the insertion of the conduit, this does not inhibit the sealing properties of the fire protection element because the remaining, intact bumps ensure an adequate, smoke gas- and fire-proofing. Moreover, the remaining bumps enable the torn bumps to get stuck, which in turn leads to a sealing. At the points where the bumps have been torn off, flat areas generally result. The elasticity of the material then results in the flat regions being able to adapt their shape to the conduit or the conduit bundle, such that a tight seal against smoke gases is further ensured.

The structured surfaces of the contact surfaces of the half elements, particularly the half cylinders, are advantageously formed by regularly or irregularly arranged protruding elements, wherein a regular arrangement is preferred. It is particularly preferred that the protruding elements are arranged periodically along imaginary lines on the base surface. It has proven advantageous for the protruding elements to run along imaginary lines parallel to the surface of the molded body which faces outward, and it is particularly advantageous if three to four rows of protruding elements are included, with respect to the thickness and/or the height of the molded body.

According to one preferred embodiment of the invention, the protruding elements themselves have varying, or the same, geometries and/or dimensions. In this way, it is ensured that multiple conduits of different sizes can be laid next to each other, with no additional effort such as cutting out the fire protection insert, for example, and without the fire protection function of the seal being compromised.

The bumps and depressions are complementary to each other, which is advantageous regarding a simpler production thereof. In the case of a fire protection element made of two molded bodies, wherein the structured surfaces face each other, the structured surfaces are preferably complementary to each other—that is, the bumps and the depressions engage with each other, wherein no holes can remain. In this way, a particularly good seal against the passage of smoke gases is achieved, even if the structured surfaces are not 100% complementary.

The shape of the bumps and depressions of the structured surface of the mold is not limited. The protruding elements are preferably pyramid-, cone-, hemisphere- or knob-shaped.

According to the manufacturing process, the bumps can be connected to each other by braces. Depending on the intended use of the fire protection elements according to the invention, these can contribute to stability—such as in the use thereof as fire protection bricks or matting, for example. In particular, the height of the braces is at most half the height of the bumps, such that the interfacing engagement of two fire protection elements which are arranged such that the structured surfaces face each other is simplified.

However, a fire protection element with bumps which are not connected by braces is preferred, particularly for the use of the fire protection element according to the invention as a wrapping. This has a direct influence on the flexibility of the fire protection element, wherein the fire protection elements without the braces are significantly more flexible.

As an alternative, the structured surface can be formed by bumps and depressions in the form of channels. The structured surface in this case is particularly wavelike, trapezoidal, or wedge-shaped in a direction perpendicular to the corresponding plane of the fire protection element. This means that the bumps and the depressions produce the specific shape together. In the following, the expression "shape of the channels/bumps" is used for this meaning. In a direction parallel to the corresponding plane of the fire protection element, the channels can run particularly in straight lines, in waves, in trapezoids, or in wedge shapes. In the following, the expression "profile of the channels/bumps" is used for this meaning. It is hereby noted that the structured surface is not limited to the shapes and profiles described here. Rather, the structured surface can assume any other shape and any other profile. The profile of the channels and/or bumps relative to a lateral edge of the fire protection element is likewise not limited. It can run parallel to a lateral edge, or also in any angle to the lateral edge—that is, inclined—wherein the channel and/or the bumps are each arranged in parallel. The bumps in this case can be alternatingly or irregularly the same, or have different heights.

The molded body preferably consists of a foamable binder which contains at least an ash-forming substance mixture, and optionally an intumescent substance mixture. The binder in this case serves as a composite-forming carrier for the ash-forming, and optionally intumescent, substance mixture. The substance mixture is preferably homogeneously distributed in the binder. The composite-forming carrier is preferably selected from the group consisting of polyurethanes, phenolic resins, polystyrenes, polyolefins such as polyethylene and/or polybutylene, melamine resins, melamine resin foams, synthetic or natural rubber, cellulose, elastomers and mixtures thereof, wherein polyurethanes are preferred.

The ash-forming and optionally intumescent substance mixture comprises the conventional fire protection additives known to a person skilled in the art, which foam in the event of a fire—that is, upon the application of heat—forming a foam which inhibits the propagation of flames, such as an intumescent material based on an acidifier, a compound which provides a carbon atom, and a gas generator. As acidifier, the intumescent material preferably includes a salt or an ester of an inorganic, non-volatile acid selected from among sulfuric acid, phosphoric acid and boric acid; as the compound which provides the carbon atom, a polyhydroxy-compound and/or a thermoplastic or thermosetting polymeric resin binder; and as the gas generator, a chloroparaffin, melamine, a melamine compound, particularly melamine cyanurate, melamine phosphate, melamine polyphosphate, tris(hydroxyethyl) cyanurate, cyanamide, dicyanamide, dicyandiamide, biguanidine and/or a guanidine salt, particularly guanidine phosphate or guanidine sulfate. As an alternative or in addition thereto, compounds which foam physically in the event of a fire, such as expandable graphite, can be used in place of the intumescent material described above.

The composite-forming carrier may further contain, as an ablative additive, an inorganic compound which has fixed water, for example as water of crystallization, and which does not dry at temperatures up to 100° C., but nevertheless releases the water in the event of a fire above 120° C., thereby being able to cool temperature-conductive parts—preferably an inorganic hydroxide or hydrate, especially aluminum, aluminum hydroxide, aluminum oxide hydrates, or partially hydrated aluminum hydroxides. However, other inorganic hydroxides or hydrates can be contemplated as well, as described in EP 0 274 068 A2.

Compounds which can be used as a substance mixture in the fire protection insert according to the invention are known to a person skilled in the art, and are disclosed for example in the following documents, to which reference is hereby expressly made: DE 30 25 309 A1, DE 30 41 731 A1, DE 33 02 416 A1, DE 34 11 327 A1, EP 0 043 952 B1, EP 0 051 106 B1, EP 0 061 024 B1, EP 0 116 846 B1, EP 0 158 165 B1, EP 0 274 068 A2, EP 1 347 549 A1, EP 1 641 895 B1 and DE 196 53 503 A1.

The molded body is produced by foam molding, such as reaction injection foaming (RIM), according to DE 3917518—for example with Fomox® fire protection foam or the building material HILTI CP 65GN, which forms an insulating later, or by cutting. Materials that can be used for the purposes of this invention are known from EP 0061024 A1, EP 0051106 A1, EP 0043952 A1, EP 0158165 A1, EP 0116846 A1 and U.S. Pat. No. 3,396,129 A, as well as EP 1 347 549 A1. The molded body preferably consists of an intumescent polyurethane foam, such as that known from EP 0061024 A1, DE 3025309 A1, DE 3041731 A1, DE 3302416 A and DE 3411 327 A1.

Due to the consistency of the foaming substance, it is possible to close off wall passages in a fireproof and gas-proof manner immediately after the production of the walls, and to cut one or multiple passages in the molded body of the fire protection insert after the installation process, wherein the diameter of the passage is precisely matched to that of the conduits and cables which pass through the same. The flexibility of the molded body material also enables the precisely flush positioning of the molded body on the conduits or cables, and can seal off the gap between the conduits' or cables' curved profiles. In addition, it is simple to cut into the molded body for the purpose of sealing off conduits and cables which are already laid, without compromising the gas-proof quality thereof.

The shape of the collar—particularly the shape of the cladding part—is matched to the shape of the molded body, and is preferably cylindrical. The height of the molded body in this case is also matched to the width of the cladding part of the fire protection collar, and advantageously corresponds to this width. The circumference of the collar in this case corresponds approximately to the outer circumference of the body defined by the molded body, although it can be slightly smaller in order to ensure a solid hold of the fire protection insert in the fire protection collar.

In one preferred embodiment of the invention, the molded body of the fire protection insert has a size such that the height of the molded body is greater than the width of the cladding part of the fire protection collar, such that the molded body projects beyond the cladding part. The molded body in this case advantageously only projects beyond the cladding part on the side which faces the wall or ceiling. Lugs are preferably also included on the cladding part, and only on the circumferential line (outer edge) of the cladding part which is opposite the wall or the ceiling. In this way, the fire protection insert is secured against slipping out or being pulled out. When installed, the lugs ensure, on the one hand, that the intumescent action of the fire protection insert in the event of a fire is oriented in the direction of the structure opening, and on the other hand that the fire protection insert can be effectively pressed against the wall or ceiling.

In one alternative embodiment, the molded body has a flange which runs at a right angle to the molded body on the base surface which faces the wall or ceiling. As an alternative, the flange can be formed by an indentation running around the circumference of the molded body, such that the circumference of the flange is at least as large as the circumference of the molded body. The flange is advantageously arranged in such a manner that it forms the outermost part of the side of the fire protection collar which faces the wall or ceiling. In this way, it is possible to achieve a smoke gas-proof connection of the fire protection collar to the wall passage, wherein the flange functions as a seal. For this reason, no additional seal using sealant is needed for the gap between the wall or ceiling and the cable bundle. This has the advantage that the circumference of the collar need only be matched to the size of the passage through the wall or ceiling, and the user has the greatest amount of flexibility in laying cable in the passage. Even if the passage is not filled with cables or conduits, there is no need to seal off the remaining, open gap with an additional fire retardant material, such as a foam or the like, because there is a sufficient seal against smoke gas via the flange and the molded body material.

In the two embodiments, the circumference of the flange preferably is at least as great as the outer circumference of the cladding part. Greater smoke gas proofing is achieved in this way because the flange is pressed against the wall or the ceiling by the cladding part.

The flange in this case must not be so thick that the distance between the collar—that is, the cladding part and the fastening part—and the wall or ceiling is so great that it is no longer possible to securely install the fire protection collar. For this reason, the thickness must be chosen such that the fire protection collar seals off the structure passage and can be easily installed on the wall or ceiling.

A further advantage of the flange is that intumescent material is placed directly on the wall or ceiling, and therefore the intumescent action in the event of a fire is also directly aimed in the direction of the wall or ceiling passage, and not only radially inward in the direction of the conduit or the cable—which achieves an additional seal.

The cladding part can be the sheet metal mantle of a conventional fire protection collar. As an alternative, the cladding part can be formed by a flexible tissue or similar material which is sufficiently dimensionally stable in the event of a fire, such that the intumescent pressure generated by the swelling fire protection insert can be directed inward toward the wall or ceiling passage.

According to one embodiment of the invention, in order to limit, to the greatest degree possible, the expansion of the fire protection insert in the event of a fire away from the conduit passage in the axial direction, and to steer the intumescence radially inward in the direction of the conduits or cables, multiple lugs which protrude inward radially are arranged along at least one circumferential line on the circumference of the cladding part, which consists of a conventional sheet metal mantle—particularly at least along the circumferential line on the circumference of the cladding part which is opposite the wall or ceiling side. In this way, the molded body is also prevented from sliding out if traction is exerted on the molded body via the conduit or the cable passing through the same.

In one preferred embodiment, the lugs are arranged on both the circumferential line of the cladding part which faces the wall or ceiling, and the circumferential line of the cladding part which faces away from the wall or ceiling. It is particularly advantageous if the multiple lugs which protrude radially inward on the circumferential line which faces the wall or ceiling are surrounded by the flange of the fire protection insert. The flange formed by the indentation, and the lugs, work together particularly advantageously if the lugs engage in the indentation of the molded body which forms the flange. In this way, the molded body is mounted in the collar in a particularly fixed manner, and it is possible to exert an additional pressure on the flange. Moreover, the molded body surrounding the lugs prevents the flange from bending and thereby from sitting flush against the wall or the ceiling.

For the installation of the fire protection collar according to the invention, the cladding part is first shortened and/or selected to correspond to the size of the fire protection insert, and is placed around the fire protection insert. The size of the fire protection insert is made to be at least large enough that the cross-section of the conduits or cables being sealed off is sufficiently covered by the base surface of the fire protection insert. Oversizing the same—that is, choosing a larger circumference of the fire protection insert—is not a critical matter, and is advantageous if it is intended that the seal be added to by a retroactive laying of further conduits and/or cables through the same. This is because it is not necessary to then install a new fire protection collar. Rather, the existing collar can be adapted easily. In this case, when the fire protection collar is installed after the wall or ceiling passage is laid with conduits or cables, the fire protection insert is cut, and specifically an amount of material of the fire protection insert is cut out—preferably from the central region—in such a manner that the fire protection insert can press against the conduits or cables with a gentle pressure once the collar is placed around the conduits or cables. In this way, the smoke gas-proof seal is ensured. The accordingly arranged fire protection collar is mounted on the wall or ceiling, via conventional fastening pieces such as hooks which can engage with the cladding part and which have an opening for the fastening means, such as a bolt, in such a manner that the fire protection insert is compressed against the surface of the wall or ceiling, and all gaps are sealed.

BRIEF DESCRIPTION OF SEVERAL VIEWS OF THE DRAWINGS

The invention is described in greater detail with reference to preferred embodiments. In the figures.

DETAILED DESCRIPTION OF THE INVENTION

Figure 1:
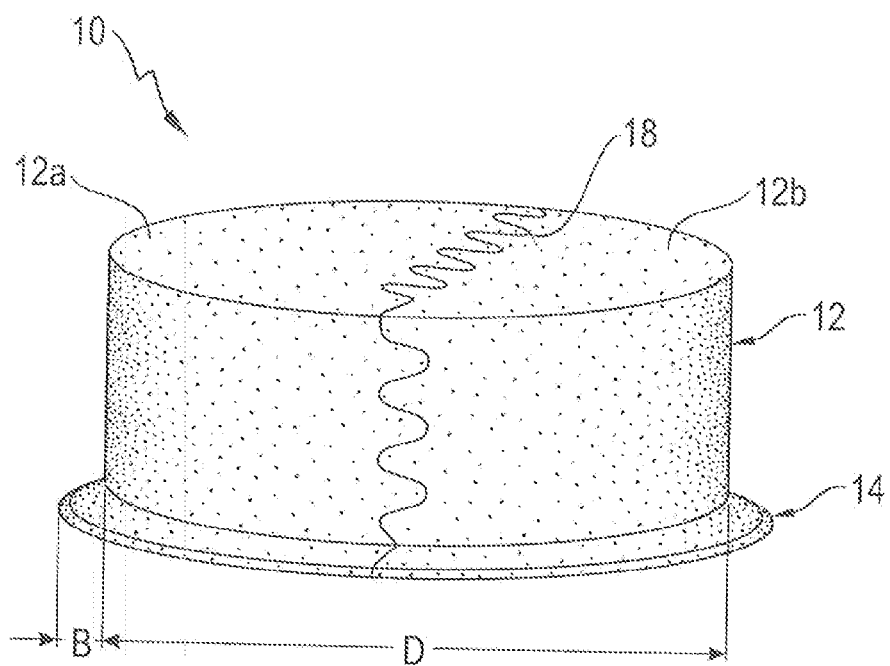
FIG. 1 shows a schematic view of the fire protection insert according to a first embodiment of the invention.

FIG. 1 shows a schematic view of a fire protection insert 10 according to a first embodiment of the invention. The fire protection insert 10 consists of a molded body 12 which has a two-piece design, consisting of two half cylinders 12a and 12b, and a flange 14 which projects by the width B beyond the diameter D of the half cylinder, wherein the flange is likewise constructed in two pieces as semicircular segments 14a, 14b which are functionally assigned to the corresponding half cylinders. This flange 14 protrudes radially outward and forms the part of the fire protection collar which abuts the wall or ceiling directly with its flat side. The surfaces of the contact surface 18 of the half cylinders shown in this embodiment are structured such that the two surfaces are configured with knobs (not visible), and these are complementary to each other such that the knobs of the one surface engage in the depressions between the knobs of the other surface.

The fire protection insert 10 in the example shown consists of foamed polyurethane with fire retardant additives distributed homogeneously therein, and has a two-piece construction, wherein the half cylinders 12a, 12b are each constructed as a single piece—that is, the half cylinders 12a and 12b and the respective flange regions 14a and 14b are produced as one piece by reaction injection molding.

Figure 2:
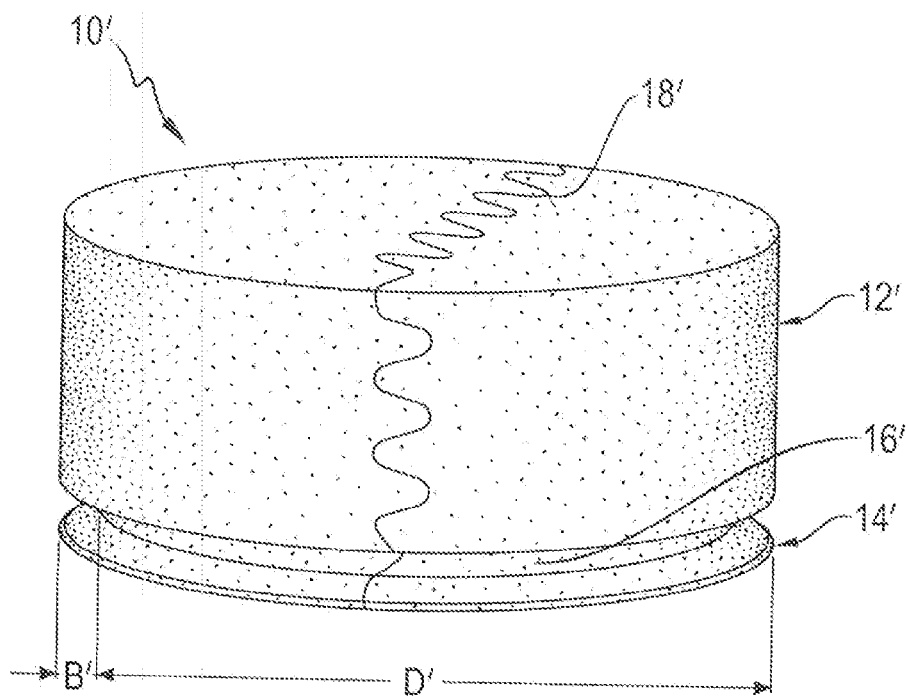
FIG. 2 shows a schematic view of the fire protection insert according to a further embodiment of the invention.

FIG. 2 shows a schematic view of a fire protection insert 10' according to a second embodiment of the invention. The fire protection insert 10' consists in this embodiment of a molded body 12' which is likewise constructed in two parts as two half cylinders 12'a and 12'b, and a flange 14' with a width B' which corresponds to the diameter D' of the half cylinder. The flange parts 14'a and 14'b in this case are formed by an indentation 16' which runs along the circumference along the shell surface of the half cylinders 12'a, 12'b.

Figure 3:
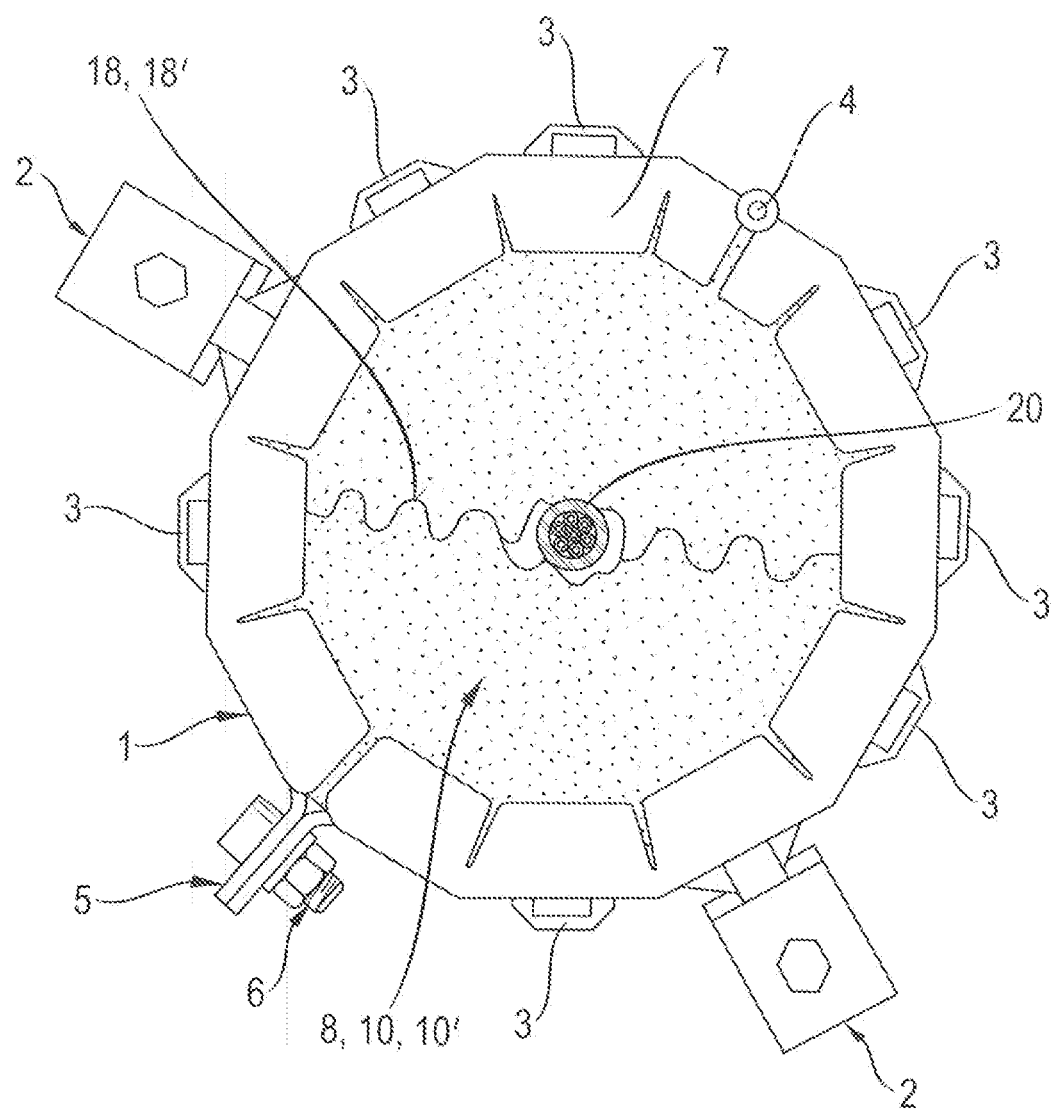
FIG. 3 shows a schematic view (top view) of a fire protection collar according to the invention, with the fire protection insert in FIG. 2.

The fire protection collar shown in top view in FIG. 3 comprises a cladding part 1 with two half shell elements which are able to pivot toward each other via a shared pivot axis 4. The end regions of the cladding part 1 which lie opposite the pivot axis 4 are formed by a closure 5 which protrudes radially, which serves the purpose of tensioning the cladding part 1. The tensioning is realized by means of at least one clamp screw 6.

The cladding part 1 consists of a sheet metal profile on which multiple lugs 7 which protrude radially inward are arranged along at least one circumference line on the circumference of the cladding part 1, in order to form a substantially circular shape. Two fastening parts 2 which protrude radially outward extend on the end faces of the cladding part 1. The lugs 7 allow the accommodation and holding of an insert 10, 10' with fire retardant properties.

The cladding part 1 possesses multiple lugs 3 which protrude substantially radially and which are arranged on the circumference in an even distribution, and serve the purpose of fixing the pipe collar to the surface of the wall or ceiling together with at least one fastening part 2. The illustrated pipe collar surrounds a conduit bundle 20 which is laid through an opening in a structure.

As an alternative (which is not illustrated), the collar can consist of a shortened piece of a continuous strip. In general, the collar can be any known collar which can be used for this specific purpose.

Figure 4:
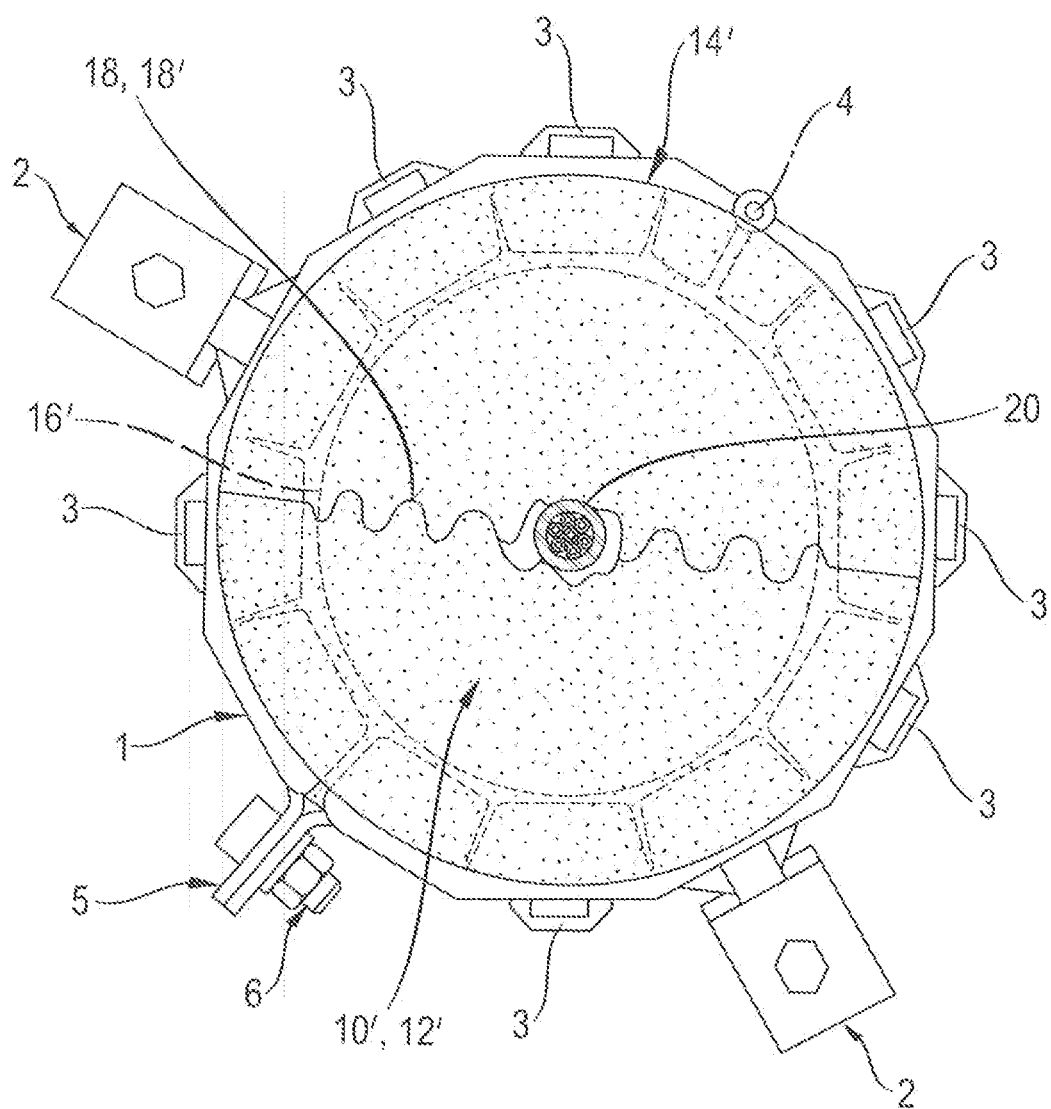
FIG. 4 shows a schematic view (from below) of the fire protection collar in FIG. 3.

FIG. 4 shows the fire protection collar illustrated in FIG. 3 from below. It can be seen that the flange 14' of the molded body 12' of the fire protection insert 10' lies over the lugs. The lugs engage in the indentation 16' of the molded body 12' which forms the flange 14'.

Figure 5:
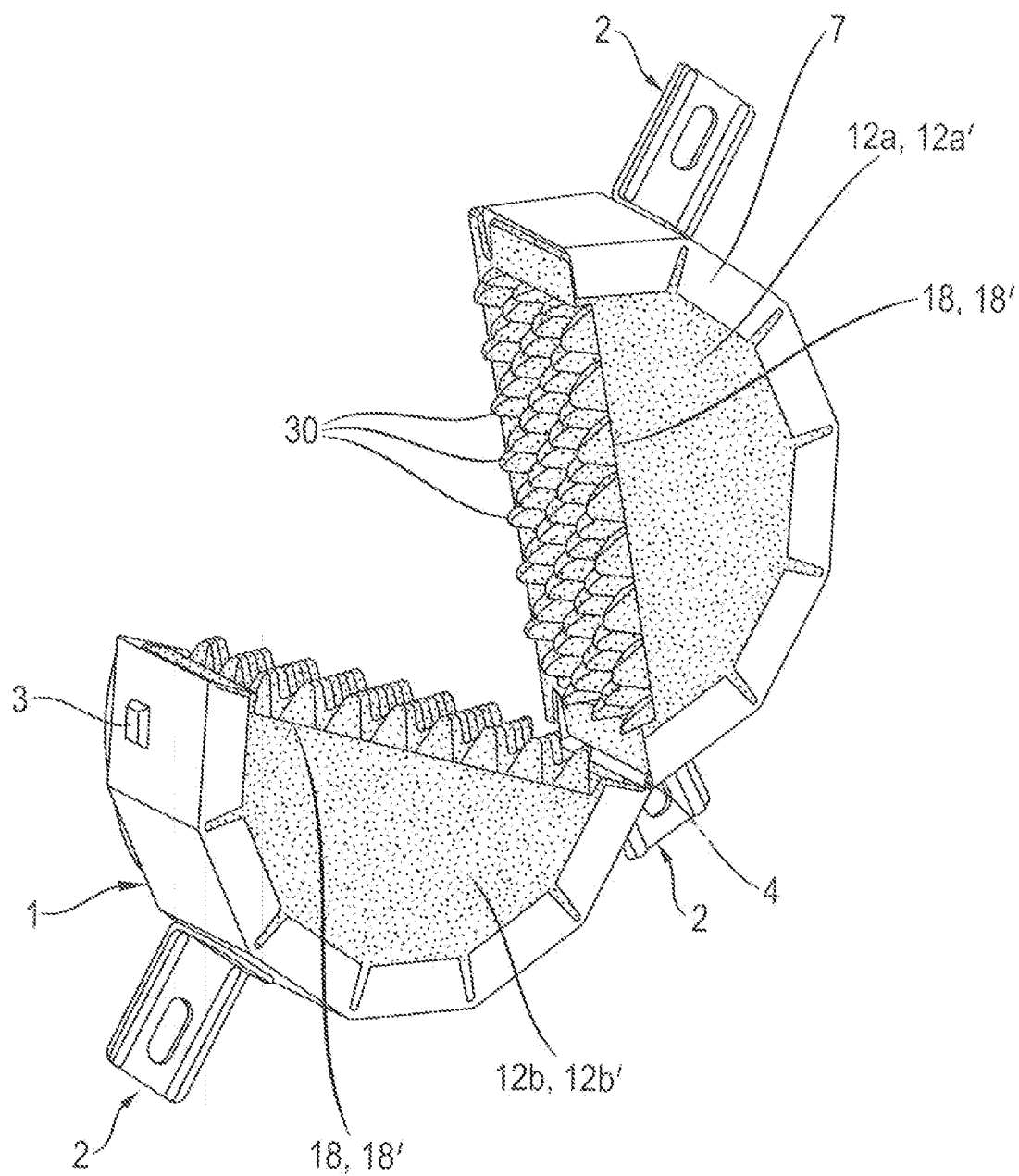
FIG. 5 shows a schematic view of an opened fire protection collar.

FIG. 5 shows the structured surface of the contact surface 18, 18' of the two half cylinders 12a, 12'a and 12b, 12'b which make up the molded body 10, 10'. The structured surface is formed in the figure shown by regularly arranged bumps in the form of knobs 30.

The invention claimed is:

1. A fire protection collar, comprising:
    an intumescent fire protection insert comprising a first molded body piece and a second molded body piece;
    a cladding part comprising a first cladding portion and a second cladding portion that are configured to surround the intumescent fire protection insert when arranged on an inner surface of the first cladding portion and the second cladding portion, wherein:
    the first cladding portion and the second cladding portion each include at least one fastening part that protrudes radially outward from at least one end face of the respective cladding portion;
    the first cladding portion and the second cladding portion, when fastened together via their respective fastening parts, encompass an interior space; and
    the first molded body piece and the second molded body piece are each configured to yield to deformation and are configured to collectively form a molded body having a closed, lateral cross section that is sized to close off a corresponding lateral cross section of the interior space encompassed by the first cladding portion and the second cladding portion and seal longitudinal ends of the cladding part from one another.

2. The fire protection collar of claim 1, wherein the first molded body piece and the second molded body piece form one of a cube, a cuboid, a prism, and a cylinder.

3. The fire protection collar of claim 1, wherein:
    the first molded body piece forms a solid, first half cylinder element;
    the second molded body piece forms a solid, second half cylinder element; and
    the first molded body piece and the second molded body piece collectively form a solid, cylinder having a closed upper and lower circular surface.

4. The fire protection collar of claim 1, wherein a first contact surface of the first molded body piece is structured to engage a second contact surface of the second molded body piece.

5. The fire protection collar of claim 4, wherein:
    the first and second structured surfaces are formed by protruding elements having a regular arrangement; and
    the protruding elements are configured to engage a plurality of conduits or cables passing between the first and second structured surface and seal gaps between said plurality of conduits or cables.

6. The fire protection collar of claim 5, wherein each protruding element have the same geometries and dimensions.

7. The fire protection collar of claim 6, wherein each protruding element has one of a pyramid shape, a cone shape, a hemisphere shape, and a knob shape.

8. The fire protection collar of claim 5, wherein each protruding element has the same height.

9. The fire protection collar of claim 5, wherein heights of the protruding elements are alternatingly different.

10. The fire protection collar of claim 9, wherein the protruding elements are between 5 mm and 50 mm high.

11. The fire protection collar of claim 4, wherein the first and second structured surfaces are complementary to each other.

12. The fire protection collar of claim 1, wherein the first cladding piece and the second cladding piece each include a plurality of lugs that protrude radially inward along a circumferential line of the respective first and second cladding piece.

13. The fire protection collar of claim 12, wherein the plurality of lugs are arranged along the circumferential line that is associated with a surface to which the fire protection collar is attached.

14. The fire protection collar of claim 1, wherein:
    the longitudinal ends of the cladding part are longitudinally offset from one another by a height of the cladding part; and
    longitudinal ends of the molded body are longitudinally offset from one another by a height of the molded body that is greater than a height of the cladding part such that the molded body projects longitudinally beyond at least one longitudinal end the cladding part.

15. The fire protection collar of claim 1, wherein a base surface of the molded body that faces a surface to which the fire protection collar is attached comprises a flange that extends radially from a lateral surface of the molded body.

16. The fire protection collar of claim 15, wherein a lateral surface of the molded body includes a channel that runs circumferentially around a periphery of the molded body and forms a flange that extends radially beyond the channel such that a diameter of the flange is at least as large as a diameter of the molded body.

17. The fire protection collar of claim 15, wherein a diameter of the flange is at least as large as an outer diameter of the cladding part.

18. The fire protection collar of claim 15, wherein a thickness of the flange permits attaching the fire protection collar to a surface.

19. The fire protection collar of claim 12, wherein:
    a lateral surface of the molded body includes an channel that runs circumferentially around a periphery of the molded body and forms a flange that extends radially beyond the channel; and
    the plurality of lugs which protrude radially inward engage the channel of the molded body.

* * * * *